United States Patent
Bray

(10) Patent No.: US 10,049,223 B1
(45) Date of Patent: Aug. 14, 2018

(54) ANALYZING ADDRESS BOOK UPLOAD REQUESTS

(71) Applicant: Microsoft Technology Licensing, LLC, Redmond, WA (US)

(72) Inventor: Jenelle Bray, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 14/686,562

(22) Filed: Apr. 14, 2015

(51) Int. Cl.
*G06F 21/62* (2013.01)
*H04L 12/58* (2006.01)
*H04L 29/06* (2006.01)

(52) U.S. Cl.
CPC .............. *G06F 21/62* (2013.01); *H04L 51/32* (2013.01); *H04L 63/1475* (2013.01)

(58) Field of Classification Search
CPC ...... G06F 21/62; H04L 51/32; H04L 63/1475
See application file for complete search history.

(56) References Cited

U.S. PATENT DOCUMENTS

| | | | | |
|---|---|---|---|---|
| 7,406,503 | B1 * | 7/2008 | Little, II | G06Q 10/107 709/206 |
| 8,010,460 | B2 * | 8/2011 | Work | G06Q 50/01 705/319 |
| 8,751,459 | B2 * | 6/2014 | Chan | G06Q 50/01 707/683 |
| 8,782,149 | B2 * | 7/2014 | Lester | G06F 17/30371 707/705 |
| 8,880,555 | B2 * | 11/2014 | Tseng | G06Q 30/02 707/791 |
| 9,230,245 | B1 * | 1/2016 | Wheeler | G06Q 50/01 |
| 9,251,470 | B2 * | 2/2016 | Hua | G06Q 30/02 |
| 9,396,288 | B2 * | 7/2016 | Tseng | G06Q 30/02 |
| 9,824,377 | B1 * | 11/2017 | Wheeler | G06Q 30/0601 |
| 2004/0015554 | A1 * | 1/2004 | Wilson | G06Q 10/107 709/206 |
| 2012/0215861 | A1 * | 8/2012 | Smith | H04L 51/12 709/206 |
| 2013/0218902 | A1 * | 8/2013 | Vendrow | G06F 17/30867 707/748 |

(Continued)

FOREIGN PATENT DOCUMENTS

CN 203580999 * 2/2014

*Primary Examiner* — Wasika Nipa
(74) *Attorney, Agent, or Firm* — Hickman Palermo Becker Bingham LLP; Daniel D. Ledesma

(57) ABSTRACT

Techniques for processing address book upload requests are provided. A user of a social network service uploads a list of email addresses. The social network service is configured to provide information about members of the social network service whose email addresses match one of the email addresses in the list of email addresses. Before providing that information, the social network service identifies attributes of the list of email addresses, the user, and/or the upload. The social network service analyzes the attributes to determine whether to provide the requested information. In one technique, the social network service creates and trains a model to learn the attributes or features (and their corresponding weights) that are associated with "bad" uploads. Example features include the number of email addresses in an upload and the number of uploads submitted by the user within the last hour.

22 Claims, 6 Drawing Sheets

(56) References Cited

U.S. PATENT DOCUMENTS

| | | | |
|---|---|---|---|
| 2015/0200903 A1* | 7/2015 | Fujita | H04L 51/32 709/206 |
| 2016/0094566 A1* | 3/2016 | Parekh | H04L 63/0414 726/1 |
| 2016/0140355 A1* | 5/2016 | Jagota | G06F 21/6218 707/785 |

* cited by examiner

ANALYZING ADDRESS BOOK UPLOAD REQUESTS

TECHNICAL FIELD

The present disclosure relates to processing email addresses and, more particularly, to determining whether to provide information about users associated with the email addresses.

BACKGROUND

Some online services, such as social network services, allow members to upload user information and provide, to the members, information about users associated with the user information. Examples of user information include email addresses and phone numbers.

For example, a user who registers with an online social network service is presented with a web page that allows the newly registered user to upload an address book of the user, such a list of email addresses of contacts in the user's email account. For each email address in the list, the social network service determines whether an existing member has registered with the email address. If so, then the social network service presents information about the existing member, such as the member's name, occupation, residence information, etc. The social network service may also allow the newly registered user to provide input that causes a connection request to be sent to the existing member so that the user and the member may be connected in the social graph maintained by the social network service.

For an email address that the social network service does not recognize, the social network service may prompt the newly registered member to send a message to the email address to invite the corresponding user to register with the social network service.

However, bad users may abuse this address book upload service by generating large lists of email addresses of people they do not know, uploading the lists to the social network service, and determining whether any of the emails are associated with members of the social network service. The email addresses in the lists may have been automatically generated using known domain names (for example, public domains, such as "yahoo.com", "gmail.com", and "hotmail.com", or corporate domains, such as "linkedin.com" and "bankofamerica.com") or may have been stolen from third party servers, such as bank servers, government servers, retailer servers, etc. For those email addresses that match email addresses of members of the social network service, an abuser may then send connection requests to the identified members, some of whom may accept the connection request. After a member accepts a connection request from an abuser, the abuser has access to potentially intimate information of the member, such as work history, academic history, residence information, personal interests and hobbies, birthday information, etc.; virtually any information that that the legitimate member provided to the social network service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for determining whether to provide information about users in response to receiving email addresses associated with the users. In one technique, a user uploads email addresses to a social network system. The social network system determines and analyzes attributes of the user providing the user identifying information and/or attributes of the email addresses. Based on the attributes, the social network service determines whether to provide, to the user, information about members associated with the email addresses.

The set of email addresses that a user sends to a social network system is referred to herein as an "address book," even though some electronic address books may contain information other than email addresses. Such other information may or may not be included in the "address book" that is transmitted to the social network system. The process for sending an address book to the social network system is referred to herein as an "address book upload."

Furthermore, while the following examples involve email addresses, other embodiments may involve other user identifying information, such as phone numbers.

SYSTEM OVERVIEW

Figure 1:
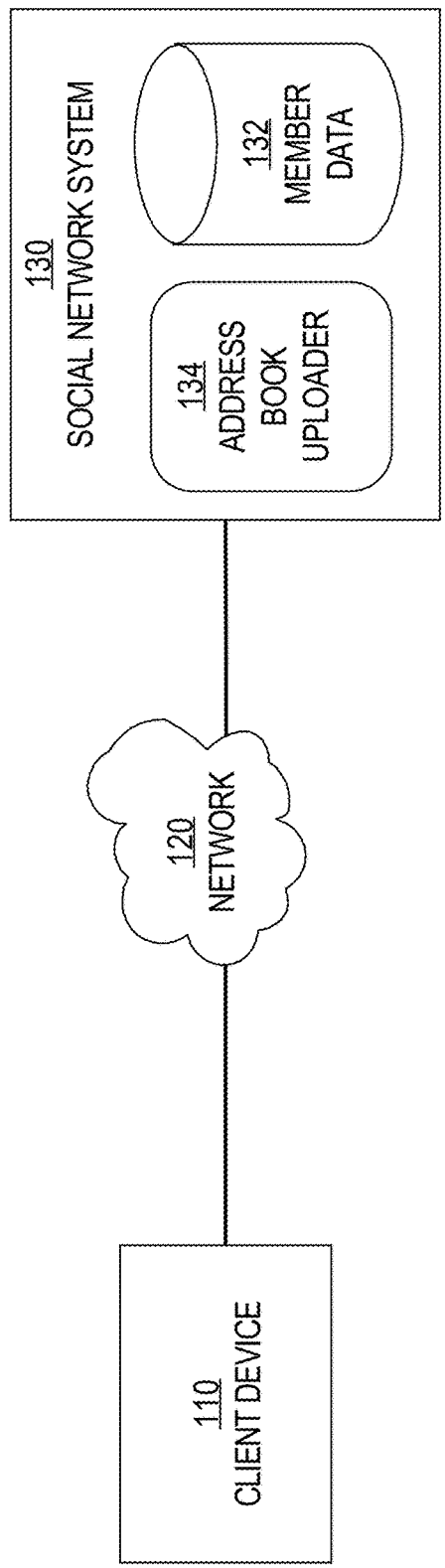
FIG. 1 is a block diagram that depicts an example system for uploading user identifying information to a social network system, in an embodiment.

FIG. 1 is a block diagram that depicts an example system 100 for uploading user identifying information to a social network service, in an embodiment. System 100 includes a client 110, a network 120, and a social network system 130. While only one client 110 is depicted, system 100 may include many clients. Also, while social network system 130 is depicted as a single element, social network system 130 may be implemented on multiple computing devices, some of which are interconnected in a local network and some of which may be distributed globally.

Client 110 is a computing device that is configured to transmit an address book, such as email addresses, to social network system 130 over network 120. Examples of client 110 include a laptop computer, a tablet computer, a desktop computer, and a smartphone.

Client 110 includes address book 112. Address book 112 may be originally stored locally on client 110 or may have first been downloaded from another source (not depicted), such as a remote third party email service. Alternatively, client 110 may instruct another service to send an address book to social network system 130.

Network 120 may be implemented on any medium or mechanism that provides for the exchange of data between client 110 and social network system 130. Examples of network 120 include, without limitation, a network such as a Local Area Network (LAN), Wide Area Network (WAN), Ethernet or the Internet, or one or more terrestrial, satellite or wireless links.

Social network system 130 is provided by a social network provider, examples of which include LinkedIn, Facebook, and Google+.

Social network system 130 stores member data 132 about multiple users (or "members") who have registered with social network system 130. Member data 132 includes user profile information for each member and connection information for each member. Thus, member data 132 indicates, for one member, a list of other members to which that member is connected in a social graph. A user profile for a member may include information provided by the member, provided by other members, and/or generated based on an analysis of the member's activity or interaction with social network system 130 and/or with one or more third party services.

Social network system 130 provides multiple services, such as services that enable members to connect with each other, to invite non-members to join social network system 130, to send private messages to each other, to post public messages available for all connections to view, to view profiles of first degree connections (and, optionally, second degree connections), to search for members (whether connected to them or not) based on one or more search criteria, etc.

Social network system 130 includes address book uploader 134, which is configured to receive address book 112 from client 110 and address books of other clients (not depicted). Address book uploader 134 may also be configured to analyze attributes associated with an address book upload, such as a number of times the user has uploaded an address book to social network system 130 within a certain period of time or how long the user has been a member of social network system 130. Address book uploader 134 may be implemented in hardware, software, or any combination of hardware and software.

PROCESS OVERVIEW

Figure 2:
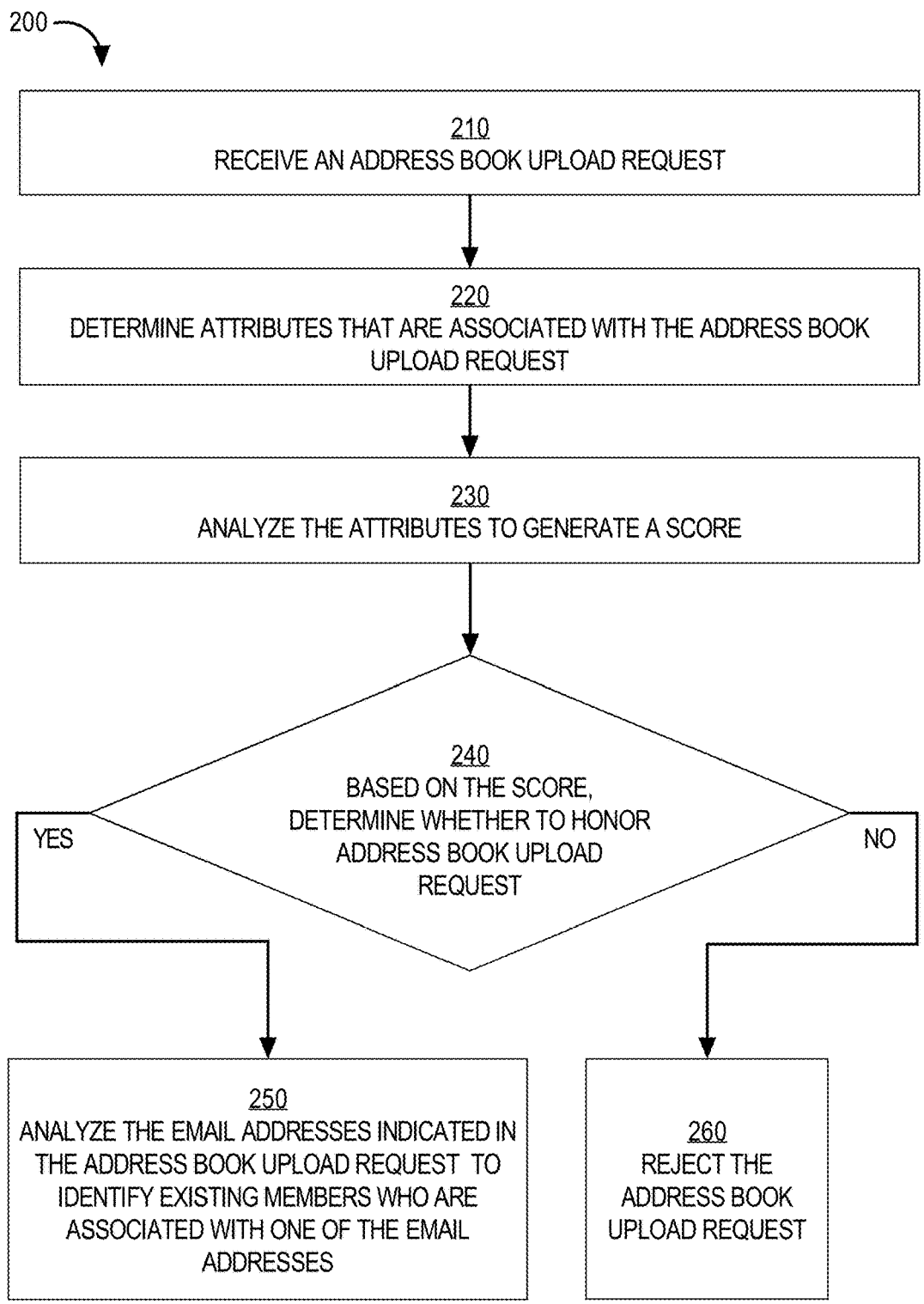
FIG. 2 is a flow diagram that depicts a process for determining whether to reject an address upload, in an embodiment.

FIG. 2 is a flow diagram that depicts a process 200 for determining whether to reject an address upload, in an embodiment. Process 200 may be performed by address book uploader 134, another component (not depicted) of social network system 130, or a combination of components of social network system 130. Therefore, each block of FIG. 2 may represent one or more sequences of computer program instructions that are stored on one or more non-transitory machine-readable media, loaded into memory and executed to cause performance of the block.

At block 210, an address book upload request is received from client 110. The address book upload request includes a set of email addresses.

At block 220, in response to receiving the address book upload request, attributes associated with the request are determined. Example attributes include how long the user associated with client 110 has been a member of social network system 130, a number of address upload requests have been received from client 110 (or the user), and a number of email addresses in the address book, and a level of similarity among the email addresses in the address book.

At block 230, the attributes associated with the address book upload request are analyzed to generate a score. The score represents a likelihood that the address book upload request is from a user with legitimate intentions. Analyzing attributes of an address book upload request may be performed in a number of ways, which are described in more detail below.

At block 240, based on the score, it is determined whether the address book upload request should be processed normally, such as by presenting user information (stored in member data 132) that is associated with known email addresses included in the address book. If so, process 200 proceeds to block 250. Else, process 200 proceeds to block 260.

At block 250, member data 132 is analyzed to identify any members of social network system 130 that are associated with an email address in the address book. A result of block 250 is the possibility of identifying, in the address book, (a) a first set of email addresses that match email addresses of members of social network system 130 and (b) a second set of email addresses that do match email addresses of members of social network system 130.

Figure 3A:
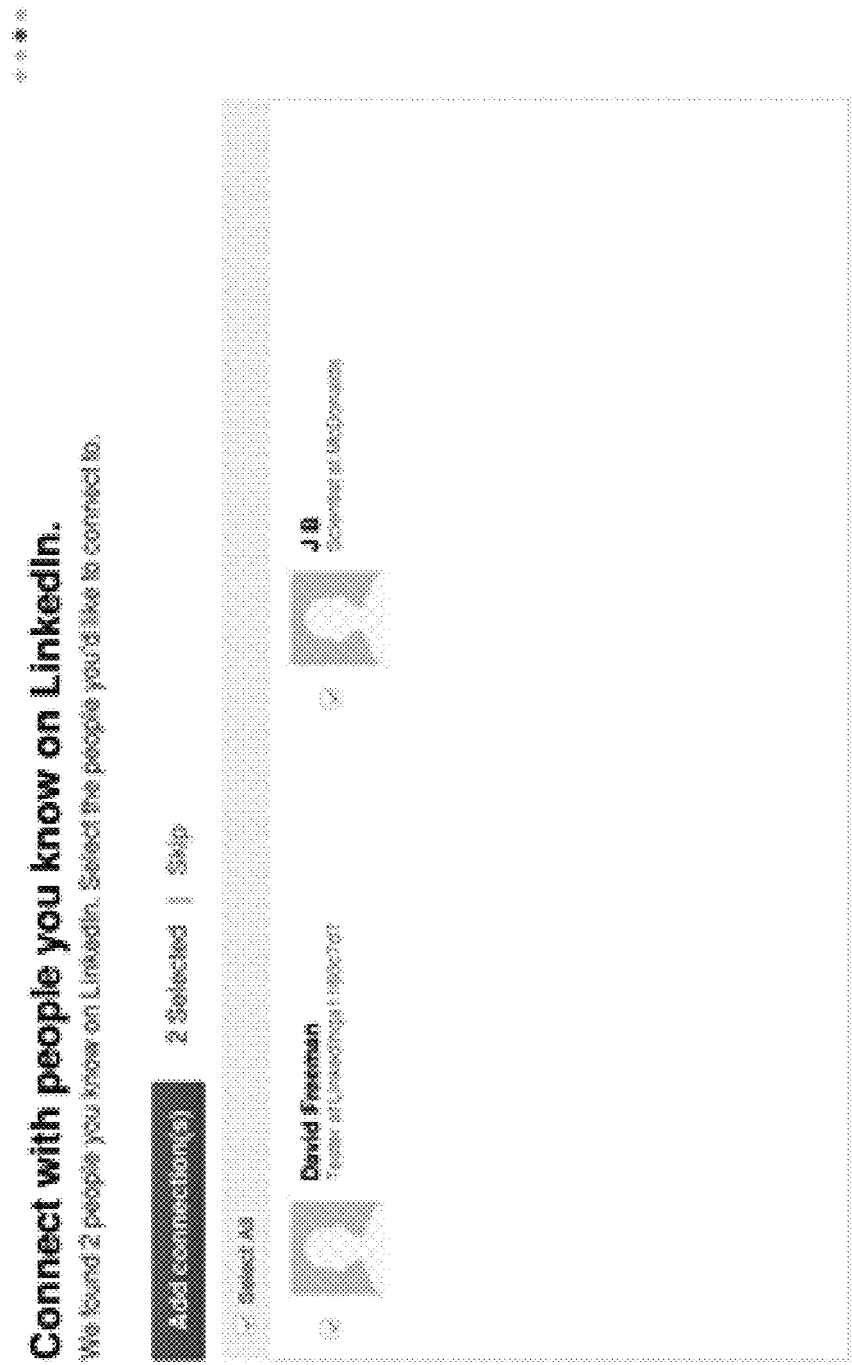
FIG. 3A is a block diagram that includes a screenshot of a first display indicating that some email addresses in an address book are associated with members of a social network system, in an embodiment.

FIG. 3A is a block diagram that includes a screenshot 310 of a first display indicating that two email addresses are associated with members of social network system 130. Full names or initials may be presented. In this example, a job title accompanies each member. The type and/or amount of profile data that is displayed to an uploader may vary depending on access permissions specified by the member whose data is being presented to others. For example, a member may allow her name and job title to be displayed, but not her profile picture.

The first display includes a button that, when selected by a user, initiates a connection request to be sent to each of the two members. If the user does not want to send an invite to one of the members, then the user may uncheck the box that is adjacent to that member's name. A default setting may be that each check box adjacent to each of the member names is checked.

Figure 3B:
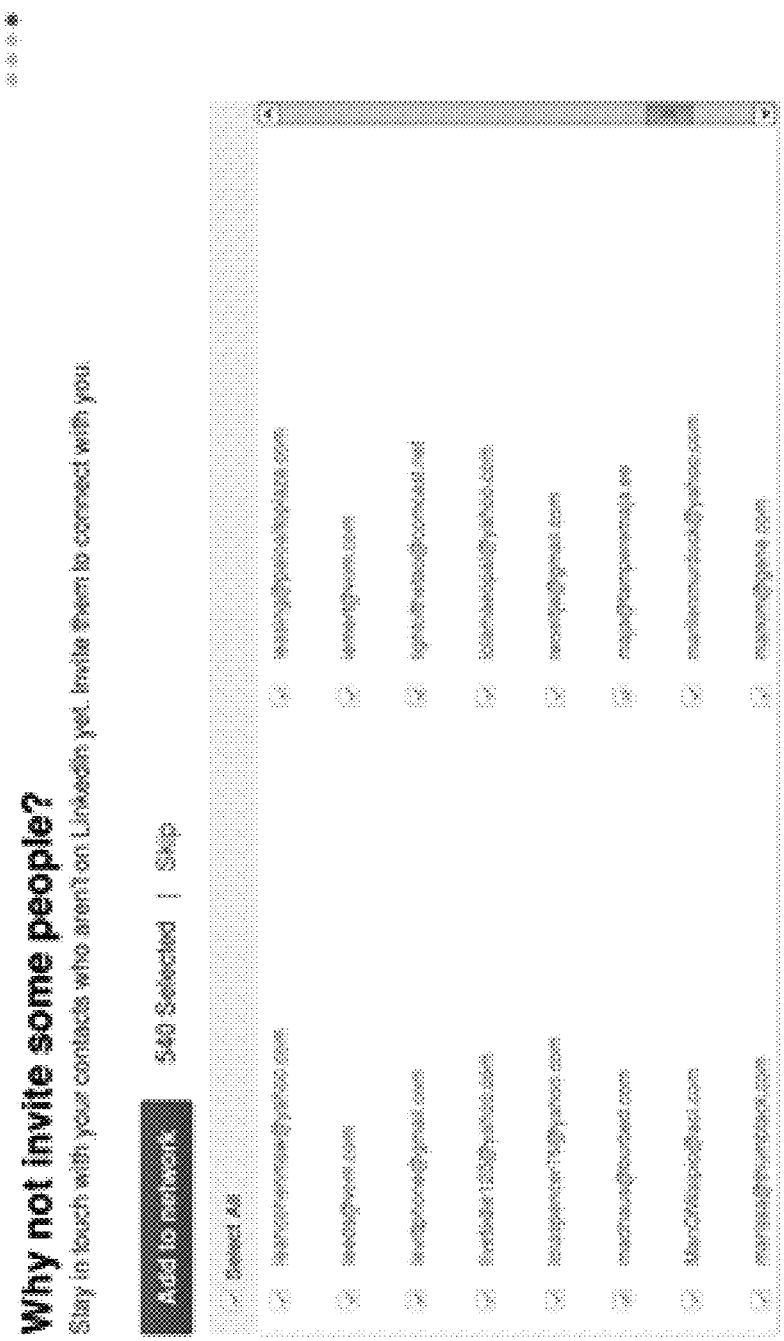
FIG. 3B is a block diagram that includes a screenshot of a second display indicating which email addresses in an address book are not associated with members of the social network system, in an embodiment.

FIG. 3B is a block diagram that includes a screenshot 320 of a second display indicating that a number of email addresses were not recognized. The first display and the second display may be presented to the uploader concurrently or serially.

The second display includes a button that, when selected by a user, initiates an add network request to be sent to the email accounts of the "checked" email addresses. A default setting may be that each check box adjacent to each of the email addresses is checked.

At block 260, the address book upload request is denied. Block 260 may involve sending, to client 110, a message that indicates that social network system 130 will not process the address book upload request.

A member that uploads an address book is referred to herein as an "uploader." An uploader that uploads an address book for a nefarious purpose is referred to herein as a "bad uploader" while an uploader that uploads an address book for a legitimate purpose is referred to herein as a "good uploader."

Processing Attributes of an Address Book Upload Request

As noted previously, attributes of an address book upload request may be processed using one of a number of approaches.

In one approach, social network system 130 stores multiple analysis rules, each of which is applied to one or more attributes of an address book upload request. Each rule corresponds to a different attribute or combination of attributes. Each rule may output a binary 1 or 0, corresponding to a "yes" or a "no." Thus, applying the rules to attributes of the address book upload request may yield a whole number greater than 0. A threshold may be defined (e.g., 5), such that a score above that threshold will cause the address book upload request to be denied. Conversely, a score below that threshold will cause the address book upload request to be accepted and processed. Thus, the threshold may indicate a total number of attributes that are characteristic of abusers of the address book upload service.

Model Approach

In another approach, a model is created, trained, and is used to make the determination of whether to process an address book upload request. Thus, attributes associated with an address book upload request are inputs to the model, which outputs a score that is used to determine whether to process the address book upload request. In modeling parlance, the attributes that are used to train a model and are input to the trained model are referred to as "feature values," which correspond to "features" that the model is configured to track.

A model is trained using labeled data. For example, some labeled data may be actual real-world examples of "bad" address books. Thus, the model is trained to learn the features that make an address book "bad" or from a member with illegitimate, forbidden, or prohibited intentions. As another example, labeled data may be generated automatically based on one or more rules, such as generating a list of at least one hundred email addresses, where each email address starts with the same character that is randomly selected at the outset.

Examples of types of features that may be used to train a model include a number of email addresses, a number of upload requests, a roundedness of numbers of email addresses, a roundedness of counters of number of email addresses, a distribution of domain first characters, a distribution of domains, a distribution of email first characters, an orderedness of the email list, a distribution of email first characters lower or uppercase, a trustworthiness of the member submitting the address book upload request, and a distribution of digits and special characters in user names. Examples of each of these types of features are provided below.

Feature Type: Number of Email Addresses

Examples of features pertaining to a number of email addresses in an address book include total number of email addresses, total number of email addresses uploaded in the last five minutes, total number of email addresses uploaded in the last hour, and total number of email addresses uploaded in the last 24 hours. The model may learn that the greater the size of an address book (i.e., total number of email addresses), the more likely that the uploader is an abuser of the address book upload service.

Feature Type: Number of Upload Requests

Examples of features pertaining to the number of upload requests include total number of upload requests in the last five minutes, total number of upload requests in the last hour, and total number of upload requests in the last 24 hours. The model may learn that if the number of uploads from a particular member is greater than three in an hour span, this may indicate mischievous intentions. The model may learn that the greater the number of upload requests from the uploader, the more likely that the uploader is an abuser of the address book upload service.

Feature Type: Roundedness of Numbers of Email Addresses

Examples of features pertaining to the roundedness of numbers of email addresses include:
  whether the total number email addresses is divisible by 50,
  whether the total number email addresses is divisible by 100,
  whether the total number email addresses is divisible by 1000,
  the degree of closeness of total email addresses to a multiple of 100, and
  the degree of closeness of total email addresses to a multiple of 1000.

The model may learn, for example, that if the size of an address book is exactly a hundred, then it is more likely that the uploader is an abuser of the address book upload service.

Feature Type: Roundedness of Counters of Numbers of Email Addresses

Examples of features pertaining to the roundedness of counters of the number of email addresses include:
  whether the number of email addresses uploaded in the last five minutes from the uploader is divisible by one hundred,
  whether the number of email addresses uploaded in the last five minutes from the uploader is divisible by 1000,
  whether the number of email addresses uploaded in the last hour from the uploader is divisible by one hundred,
  whether the number of email addresses uploaded in the last hour from the uploader is divisible by 1000,
  whether the number of email addresses uploaded in the last 24 hours from the uploader is divisible by one hundred, and
  whether the number of email addresses uploaded in the last 24 hours from the uploader is divisible by 1000.

Thus, an uploader may make multiple upload requests that include address books of various sizes. But if the total size of the individual address books submitted within a particular time frame (e.g., five minutes) is divisible by a whole number, such as one hundred, then it may be more likely that the uploader is an abuser.

Feature Type: Distribution of Domain First Characters

Examples of features pertaining to distribution of domain first characters include:
  number of first distinct domain characters,
  fraction of domains starting with most common domain first character fraction of domains starting with two most common
domain first characters,
fraction of domains starting with three most common
domain first characters,
whether all domains start with the same letter,
whether all domains start with one of two letters,
whether all domains start with one of three letters.

For example, an address book where the domain names of all email addresses start with the same letter may be more likely than other address books to be from a bad uploader. An example of such an address book is the following:
reimer@innovativemachining.com
dl@inlanta.com
lonnie_heidtke@instrumental.com
kevin.mcwilliams@insperityworkforcemanagement.com
jessica_dellemann@iscinsurance.com
cdenise@innovationedge.com
schad@innovative-signs.com
gondek@innovativeprototyping.com
tomo@integratedmail.com
wayne_haddon@idcwi.com
mfritz@inlanta.com
rg@isc-depere.com
hjaime@intecwi.com
bhans@imsdm.com
john.abraham@inntech.us
nsteve@insightvisioncameras.com
jimp@innovationmold.com Feature Type: Distribution of Domains Examples of features pertaining to distribution of domains include:
fraction of domains that are the most common domain,
fraction of domains that are the two most common domains,
fraction of domains that are the three most common domains,
whether there is only one domain,
whether there are only two domains,
whether there are only three domains, For example, if 99% of the domains in an address book have the same domain, then it may be indicative that the address book is from a bad uploader. An example of such an address book is the following:
156561000@qq.com
156561001@qq.com
156561002@qq.com
156561003@qq.com
156561004@qq.com
156561005@qq.com
156561006@qq.com
156561007@qq.com
156561008@qq.com
156561009@qq.com
156561010@qq.com Feature Type: Distribution of First Characters of the Email Addresses Examples of features pertaining to distribution of email first characters include:
number of first distinct characters,
fraction of emails starting with the most common first character,
fraction of emails starting with the most common first character,
fraction of emails starting with the most common first character,
whether all emails start with the same letter,
whether all emails start with one of two letters,
whether all emails start with one of three letters.

For example, if a large fraction of email addresses in an address book start with the same character, then it may be indicative that the address book was generated automatically. An example of an address book from a bad uploader is the following:
dop@hotmail.com
door244@hotmail.com
doodah_ksa_1@hotmail.com
doodi73@yahoo.com
donkinpro@intekom.co.za
dony_88@hotmail.com
doool@maktoob.com
doniasahar@hotmail.com
doosri@hotmail.com
doshkaxxx@yahoo.com
dopepktun@hotmail.com
dossaa0d@hotmail.com
donnasfuhouse@bigplanet.com
dooly143@hotmail.com
donnatellla@yahoo.com
dongoan93@hotmail.com
DOOM2000DZ@yahoo.com Feature Type: Orderedness of Address Book Examples of features pertaining to the orderedness of an address book include:
whether all consecutive pairs of usernames are increasing or decreasing alphabetically, and
whether there is a deviation from 50% of consecutive pairs of usernames that are increasing alphabetically.

A random list of names should have about 50% of usernames increasing alphabetically. The second feature above looks at how far off from 50% the number of alphabetical consecutive names is.

Feature Type: Distribution of First Characters Lower or Uppercase

Examples of features pertaining to distribution of email first characters lower or uppercase include:
whether there is (and/or an value indicating) a deviation from 50% starting letters starting with capital letters,
whether all email addresses start with lowercase letters, and
whether all email addresses start with uppercase letters.

If, for example, all email addresses in an address book start with uppercase letters, then that feature value may be indicative that the address book was automatically generated and is being submitted by a bad uploader.

It may be determined that a random list of user names should have about 50% of first characters as capital letters. The first feature above looks at how far off from 50% the fraction of starting capital letters is.

Feature Type: Trustworthiness of Member

Examples of features pertaining to the trustworthiness of a member that submitted an address book upload request include number of days since the member registered with social network system 130 and whether the signup is "cold" or "warm." An example of a "warm" signup is one where the member was invited to join social network system 130, such as through an email directed to the member and initiated by another member of social network system 130. Another example of a warm signup is where the member selected a link on a third party web site and was directed to a web site provided by social network system 130.

A "cold" signup is one where the member visited a web page of social network system 130 without being invited or without selecting a link on a third party partner web site. For example, the member may have entered a URL of a web site of social network system 130. As another example, the member may have initiated a search through a search engine by entering characters into a text field. In response, the search engine generated a search results page that included a link to a web site of social network system 130, which link the member selected.

Uploaders associated with "cold" signups may be more likely than "warm" uploaders to be abusers of the address book upload service.

Regarding days since the member registered, the less the amount of time that has elapsed since the uploader registered with social network system 130 until the uploader submitted an address book upload request, the more likely the uploader may be an abuser of the address book upload service.

Feature Type: Distribution of Digits and Special Characters in Usernames

Examples of features pertaining to distribution of digits and special characters in the username portion of email addresses include:
- statistics on length of usernames (e.g., mean, median, standard deviation),
- statistics on username period count (e.g., mean, median, standard deviation),
- statistics on username underscore count, statistics on username hyphen count,
- statistics on username digit count, stats on capital letter count,
- whether the standard deviation of the username length is 0,
- whether the standard deviation of the period count is 0,
- whether the standard deviation of the underscore count is 0,
- whether the standard deviation of the hyphen count is 0,
- whether the standard deviation of the digit count is 0,
- whether the standard deviation of the capital letter count is 0.

If, for example, all the usernames in an address book have the same underscore count, then it may be indicative that the address book was automatically generated and is being submitted by a bad uploader.

Other Feature Types

Other feature types (associated with an address book upload) that may be considered by the model include features related to the IP address of client 110 that is employed by the uploader, the Internet Service Provider (ISP) of the uploader, a number of times social network system 130 has detected the IP address (such as during a particular period of time), a number of times social network system 130 has detected a browser cookie associated with client 110, a fraction of email addresses, in the address book, that are members of social network system 130, a fraction of the email addresses that contain names, a source of the address book (e.g., from the mobile context, a file upload, a third party source (such as Google or Yahoo), or Microsoft Exchange), a level of connectedness of members of social network system 130 whose email addresses are found in the address book, and repeated uploads of the same size.

Training Data

The model may be trained using different sets of bad address books (or "uploads), labeled as such. In one approach, all known (or at least labeled) bad address books are used to train the model. In another approach, a subset of all bad address books is used to train the model. For example, each bad address book is associated with a bad uploader. Some bad uploaders submitted (or are associated with) multiple bad address books. A randomly selected bad address book is selected from each bad uploader. If, for example, bad address books from the same bad uploader are used to train the model and the bad address books had identical (or at least very similar) feature values, then the model may be trained "too much" for that bad uploader and may not detect bad address books from other uploaders.

Additionally, all known (or at least labeled) "good" address books may be used to train the model. An address book may be automatically identified and labeled as "good" if the uploader of the address book is a member of social network system 130 that is deemed in good standing, such as a member who has over five hundred connections, has connections to a threshold number of other members that are deemed to be in good standing, or has paid for one or more services provided by social network system 130.

In a related approach, a subset of all good address books is used to train the model. For example, similar to bad address books, each good address book is associated with a good uploader. Some good uploaders submitted (or are associated with) multiple good address books. A randomly selected good address book is selected from each good uploader.

Validation

In an embodiment, the model is validated by selecting a number of data sets (or address book uploads) and applying them as input to the model. Each data set is also known (or at least deemed) good or bad. The model generates a score that indicates whether the address book is good or bad and that result is compared to the correct answer. If the model is correct a certain percentage of the time (e.g., 99%), then the model is deemed validated and ready for use in production against "live" address books, or address books that social network system 130 has not analyzed previously or at least that the model has not been trained on previously.

If the model is not correct a threshold percentage of the time, then the model is not ready for production. One of multiple approaches may be used at this point. In one approach, a new model is created and trained on a different set of training data, such as randomly-selected address books from known bad uploaders. In another approach, the non-validated model is trained based on additional address books that are considered similar to the address book(s) that the model incorrectly scored.

Figure 4:
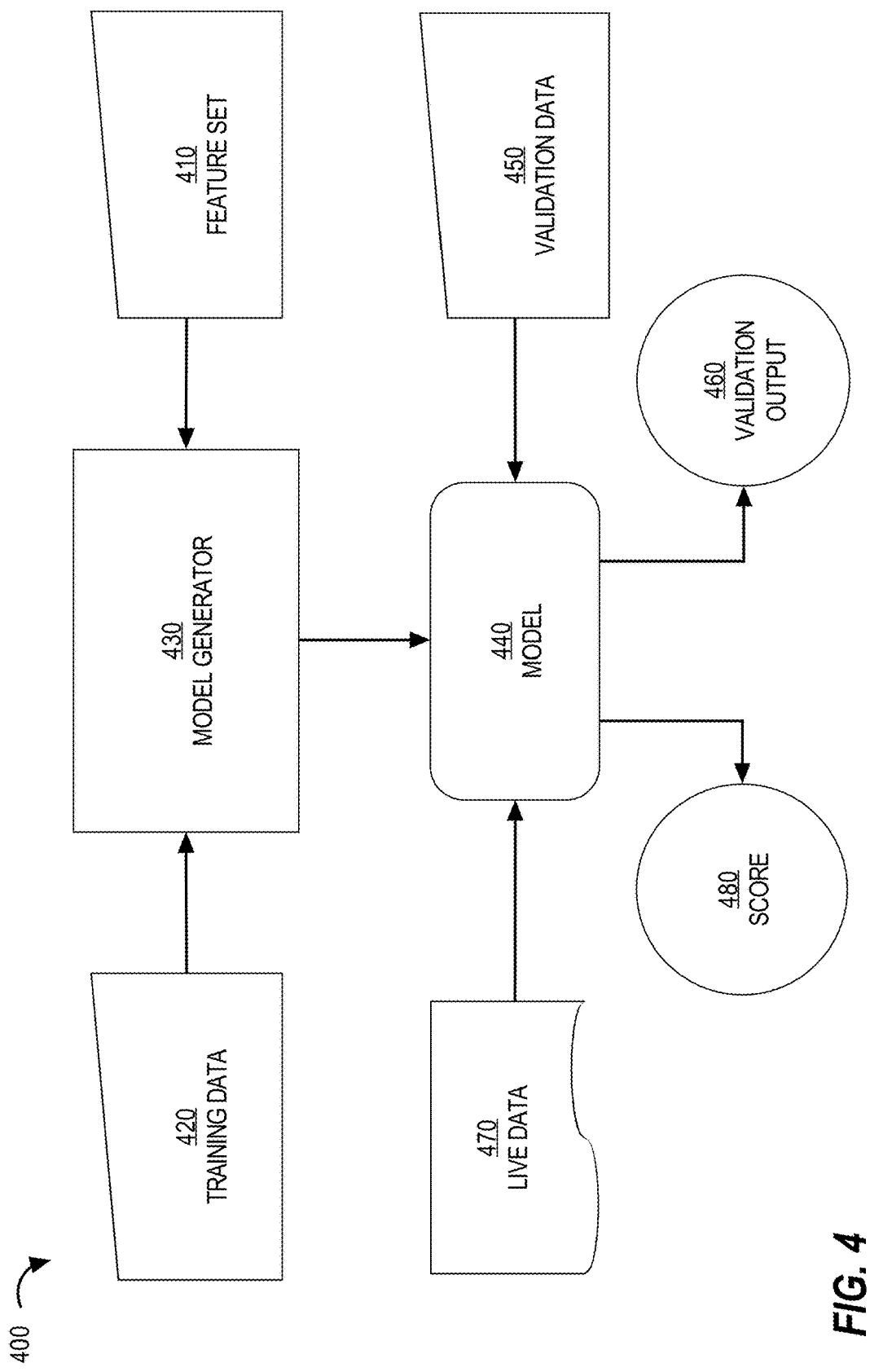
FIG. 4 is a block diagram that depicts a process for generating, training, and using a model for detecting address book upload abuse, in an embodiment.

FIG. 4 is a block diagram that depicts a process 400 for generating, training, and using a model for detecting address book upload abuse, in an embodiment. Process 400 may be implemented by one or more components in social network system 130.

Feature set 410 is provided as input to model generator 430. Feature set 410 may be specified by one or more users.

Training data 420 is provided as input to model generator 430. Training data 420 comprises multiple data sets, each data set corresponding to a different address book. Some of data sets are labeled as "bad" address books while other data sets are labeled as "good" address books. The data sets in training set 410 may have been gathered over a long period of time or may be restricted to only address books uploads that have been "seen" (or received by social network system 130) over a relatively recent period of time (e.g., one year).

Model generator 430 analyzes training data 420 based on the features indicated in feature set 410. Output of model generator 430 is model 440.

Before using model 440 for "live" address book uploads, model 440 is validated based on validation data 450, which includes multiple data sets, although the number of data sets in validation data 450 may be much less (e.g., three times less) than the number of data sets in training data 420. Model 440 generates validation output 460 that indicates a score for each data set in validation data 450.

Although FIG. 4 depicts model 440 has receiving validation data 450 and live data 470, a different version of model 440 may receive and process live data 470 than the version that received and processed validation data 450. Thus, an analysis of validation output 460 may indicate that model 440 is not ready for production or for use on "live" address book uploads. Therefore, model generator 430 or another component (not depicted) may refine or further modify model 440.

A score threshold may be selected after model 440 is validated based on analyzing validation output 460. Once an acceptable score threshold is selected, live data 470 is provided as input to model 440, which produces score 480.

Selecting a Score Threshold

As described previously, the model outputs a score. In order to determine whether to accept or reject an address book upload, the score is interpreted, such as by determining whether the score is greater than (or less than) a particular threshold. In an embodiment, the particular threshold is selected to ensure a low false positive rate. In other words, an address book should not be determined to be "bad" when the address book is good or from a member with legitimate purposes. On the other hand, the model should identify a high percentage of bad address books (referred to as the "true positive rate" or "recall").

If a relatively low score (e.g., 0.01 on a 0-to-1 scale) is chosen as the threshold above which a scored address book is considered a bad address book, then, although there will be a high true positive rate, there will be also be a high false positive rate. On the other hand, if a relatively high score (e.g., 0.99 on a 0-to-1 scale) is chosen as the threshold above which a scored address book is considered a bad address book, then, although there will be a low false positive rate, there will be also be a low true positive rate. Thus, the higher the true positive rate, the higher the false positive rate. Similarly, the lower the false positive rate, the lower the true positive rate.

Accordingly, in an embodiment, these two metrics (false positive rate and true positive rate) are used to select a score threshold. Results of a validation phase may be plotted on a graph where the x-axis corresponds to scores generated by the model, each point on the x-axis corresponding to a different address book. The score that is set as the threshold is selected such that the true positive rate is above a first threshold percentage (e.g., 70%) and the false positive rate is below a second threshold percentage (e.g., 0.5%).

In an embodiment, the score threshold is updatable. For example, later, if emphasis is being placed on catching more bad uploaders, then the score threshold may be decreased. Alternatively, if address book abuse is diminishing, then the score threshold may be increased. Such a modification of the score threshold may be manual or automatic. For example, certain inputs (such as a number of member complaints about invitations from unknown people in the last week may be used to determine whether to increase or decrease the score threshold.

Feature Scaling

In an embodiment, some of the feature values are scaled or normalized before being processed by the model. Examples of such features include the number of email addresses in an address book and the number of distinct first domain characters. The difference in these numbers may be significant. For example, number of email addresses in an address book may be three hundred while there are only three distinct first domain characters in the address book. Therefore, normalizing feature values will allow the feature values to be processed without large feature values dominating small feature values in the analysis.

One approach to normalize is to calculate a z-score for a feature value. Calculating z-score involves dividing the difference between the feature value and the mean (which refers to the mean of that feature over all the values in the training set) by the standard deviation. The result is a value between −1 and 1.

Model Type

Embodiments are not limited to the type of model that is used. In an embodiment, logistic regression, one type of classification model, is used to model a training data set of known (or labeled) bad address books and good address books.

Logistic regression is used to predict a binary response from a binary predictor, which is used for predicting the outcome of a categorical dependent variable based on one or more predictor variables (or "features"). That is, logistic regression is used in estimating the parameters of a qualitative response model. The probabilities describing the possible outcomes of a single trial are modeled, as a function of the explanatory features, using a logistic function.

The following is an example logistic function that may be used to generate a score based on a set of feature values:

$$p(y=1|x,\theta)=1/(1+\exp(-\theta^T x))$$

where x is the set of feature values, θ is the set of coefficients or weights that are applied to the feature values, ($\theta^T x$) is the sum of the product of each feature value with its corresponding coefficient/weight. The output of this logistic function is a score between 0 and 1.

The following is an example objective function that may be used to choose a number of coefficients (and, thus, a number of features to use in the model) and a size of each coefficient.

$$\mathrm{argmax}\theta \sum_{i=1}^{m} \log p(yi|xi, \theta) - \alpha R(\theta)$$

where $x_i$ refers to a particular feature value and m refers to the number of features in the model, 'θ' in 'arg max θ' is a subscript of 'arg max' and 'i' in 'yi' and 'xi' is a subscript of y and x.

R(θ) may be determined with the following formula:

$$L1: R(\theta) = \|\theta\|1 = \sum_{i=1}^{n} |\theta i|$$

where '1' in '$\|\theta\|1$' is a subscript of '$\|\theta\|$' and 'i' in 'θi' is a subscript of θ.

R(θ) involves summing the absolute value of each coefficient $\theta_i$. An effect of αR(θ) on the remainder of the objective function (argmax$_\theta$) is penalizing the usage of too many coefficients and, thus, too many features. After θ is determined by the objective function, θ is provided as input to the logistic function, along with x (i.e., feature values of a particular address book), to generate a score for the address book.

Small Address Books

In an embodiment, address books of a relatively small size are analyzed differently than address books of a relatively large size. For example, some features described previously consider every email having the same or similar property, such as the same domain name or the same first character in the username. Therefore, the coefficients of such features are reduced (or otherwise penalized) when "small" address books are analyzed. A small address book is one that is less than a particular threshold number, such as 50.

In an embodiment, multiple sets of weights are stored and later used, each set for a different range in address book size. For example, if an address book has less than 50 email addresses, then a first set of weights are used to calculate a score for the address book. If an address book has between 51 and 100 email addresses, than a second set of weights are used to calculate a score for the address book. If an address book has over 100 email addresses, then none of the weights are used. In this example, the first set of weights and the second set of weights may be for the same set of features. Alternatively, the two sets of weights may be for overlapping, but different sets of features.

In a related embodiment, multiple models may be generated, each corresponding to a different range of address book sizes. In this embodiment, each model is trained (and validated) based on sample address books that have a size that corresponds to the size of the model.

Single Email Lookups

In an embodiment, an uploader may submit a single email address at a time. Such an upload is referred to herein as a "single address upload." Therefore, model features that depend on multiple email addresses in a single address book are not relevant. However, in an embodiment, in a scenario where an uploader is the source of multiple single address uploads over a period of time to social network system 130, address book uploader 134 aggregates the email addresses into a set, analyzes the set of email addresses for multiple feature values, and provides those feature values to the model (or to a different model).

For example, in response to receiving, from a member, an upload request that contains a single email address, address book uploader 134 (or an associated component) identifies all the email addresses submitted by the member in the last 24 hours. Such email addresses may include email addresses that were submitted in single address uploads and/or in one or more address book uploads.

In a similar example, in response to receiving, from a member, an upload request that contains a single email address, address book uploader 134 (or an associated component) identifies the last one hundred email addresses submitted by the member, regardless of the length of the time period between the first email address submission (whether an address book upload or a single address upload) and the current single address upload. If the member has ever submitted less than one hundred email addresses, then only those email addresses are analyzed.

In an embodiment, a different model is generated, trained, and used for determining whether a single address upload is to be accepted. Alternatively, the same model that is used to score an address book upload is used to score a single address upload. However, in the same model scenario, the model may be modified to deemphasize (or emphasize) one or more feature values, excluding certain feature values, or make coefficients of certain features zero, effectively eliminating the affect that the corresponding feature values have on the outputted score.

In a related embodiment, a different score threshold is selected for a model when calculating a score for a single address upload. For example, for address book uploads the score threshold may be 0.123, while for single address uploads the score threshold may be 0.291. The different score threshold may be selected regardless of whether a different model is used for single address uploads.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
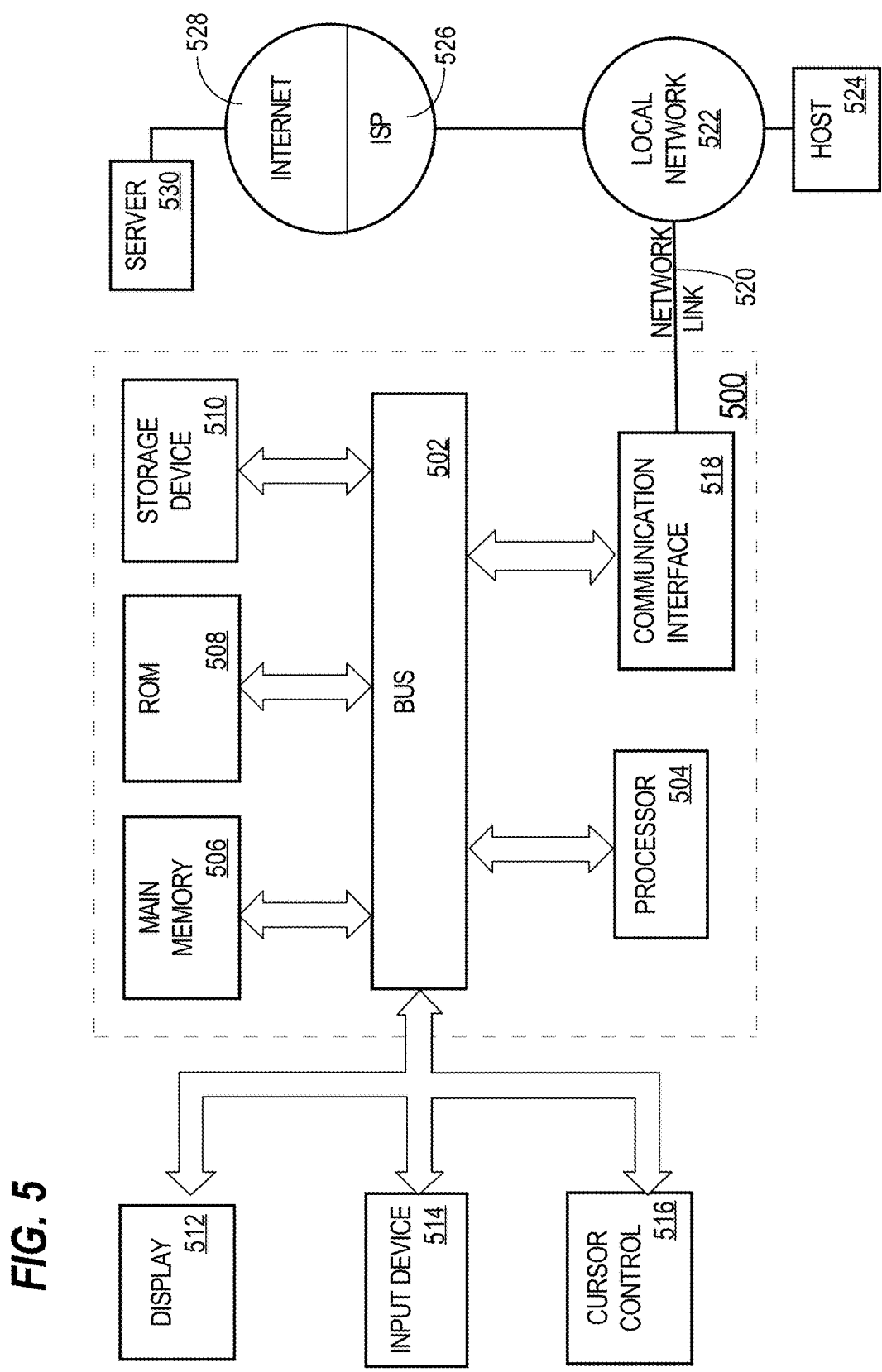
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a client device, input that includes a set of multiple email addresses;
   in response to receiving the input:
   identifying a plurality of feature values associated with the input;
   based on the plurality of feature values, generating a score;
   based on the score, determining whether to send, to the client device, information about multiple users, each user being different than a user of the client device and being associated with an email address in the set of multiple email addresses;

determining, based on the score, to not send, to the client device, information about any user that is associated with any email address in the set of multiple email addresses;

prior receiving the input, storing profile data about a plurality of users in a social network;

wherein each user of the multiple users is one user of the plurality of users;

wherein the information is a portion of the profile data;

wherein each user of the multiple users provided a portion of the information to a social networking system that stores the profile data;

wherein generating the score comprises providing the plurality of feature values to a model that is trained on a plurality of features corresponding to the plurality of feature values;

wherein the model generates the score;

wherein the plurality of feature values include one or more of:
- a number of days since a particular user associated with the client device has registered with an entity that receives the set of email addresses,
- a number of uploads of sets of email addresses in a particular period of time,
- a number of email addresses in the set of email addresses,
- whether the number of email addresses in the set of email addresses is a multiple of a particular round number,
- whether all email addresses in the set of email addresses start with three or fewer characters,
- a fraction of the set of email addresses that begin with the most common letter,
- a number of distinct first letters in the domain name portion of the set of email addresses,
- whether all email addresses in the set of email addresses begin with an uppercase letter,
- whether all email addresses in the set of email addresses begin with a lowercase letter, or
- a degree of closeness of the number of email addresses, in the set of email addresses, to a multiple of a first round number;

wherein the method is performed by one or more computing devices.

2. The method of claim 1, wherein one or more feature values of the plurality of feature values pertain to the client device that provided the input or to the user that initiated the input.

3. The method of claim 1, further comprising:
normalizing one or more feature values of the plurality of feature values to generate one or more normalized feature values;
generating the score comprises inputting the one or more normalized feature values into the model to generate the score.

4. The method of claim 1, further comprising:
training the model based on a first plurality of data sets, each of which is labeled as a first type of data set.

5. The method of claim 4, further comprising:
storing a second plurality of data sets, each of which is labeled as the first type of data set;
storing source data that indicates a source for each data set in the second plurality of data sets;
wherein a first source is a source for a first set of data sets in the second plurality of data sets;
wherein a second source is a source for a second set of data sets in the second plurality of data sets;
randomly selecting one or more first data sets from the first set of data sets, wherein the first plurality of data sets includes the one or more first data sets;
randomly selecting one or more second data sets from the second set of data sets, wherein the first plurality of data sets includes the one or more second data sets.

6. The method of claim 4, further comprising:
training the model based on a second plurality of data sets, each of which is labeled as a second type of data set that is different than the first type.

7. The method of claim 6, further comprising:
storing a third plurality of data sets, each of which is labeled as the second type of data set;
randomly selecting data sets from the third plurality of data sets to identify the second plurality of data sets.

8. The method of claim 1, further comprising:
determining the number of email addresses in the set of multiple email addresses;
if the number of email addresses is within a first range, then identifying a first plurality of feature values, wherein the score is generated based on the first plurality of feature values if the number of email addresses is within the first range;
if the number of email addresses is within a second range that is different than the first range, then identifying a second plurality of feature values that are different than the first plurality of feature values, wherein the score is generated based on the second plurality of feature values if the number of email addresses is within the second range.

9. The method of claim 1, further comprising:
determining a number of email addresses in the set of multiple email addresses;
if the number is less than a particular threshold, then, for each feature value of one or more feature values in the plurality of feature values, identifying a weight;
wherein generating the score comprises generating the score based on the weight identified for said each feature value of the one or more feature values.

10. The method of claim 1, wherein the multiple users are of the plurality of users and the profile data includes the information about the multiple users, the method further comprising:
based on the score, determining to not send, to the client device, the information about the multiple users.

11. The method of claim 1, wherein a particular feature value in the plurality of feature values pertains to an attribute of usernames or domain names indicated in the set of email addresses.

12. The method of claim 1, wherein the set of multiple email addresses is a first set of email addresses, the method further comprising:
receiving, from a second client device, second input that includes a second set multiple email addresses that is different than the first set of email addresses;
in response to receiving the second input:
identifying a second plurality of feature values associated with the second input;
based on the second plurality of feature values, generating a second score;
based on the second score, determining whether to send, to the second client device, information about multiple second users, each user being associated with an email address in the second set of multiple email addresses;

determining, based on the second score, to send, to the second client device, information about the multiple second users.

13. A system comprising:

one or more processors;

one or more non-transitory storage media storing instructions which, when executed by the one or more processors, cause:

receiving, from a client device of a requestor, input that includes a set of one or more email addresses;

in response to receiving the input:

identifying a plurality of feature values associated with the input;

based on the plurality of feature values, generating a score;

based on the score, determining whether to send, to the client device, information about a user that is different than the requestor and that is associated with an email address in the set of one or more email addresses;

determining, based on the score, to not send, to the client device, information about a user that is different than the requestor and that is associated with any email address in the set of one or more email addresses;

prior to receiving the input, storing profile data about a plurality of users in a social network;

wherein the user is one user of the plurality of users;

wherein the information is a portion of the profile data;

wherein the user provided the information to a social networking system that stores the profile data;

wherein the requestor is not connected, in a social graph, to any user that is associated with an email address in the set of one or more email addresses;

wherein generating the score comprises providing the plurality of feature values to a model that is trained on a plurality of features corresponding to the plurality of feature values;

wherein the model generates the score;

wherein the plurality of feature values include one or more of:

a number of days since a particular user associated with the client device has registered with an entity that receives the set of one or more email addresses, a number of uploads of sets of email addresses in a particular period of time, a number of email addresses in the set of one or more email addresses, whether the number of email addresses in the set of email addresses is a multiple of a particular round number, whether all email addresses in the set of email addresses start with three or fewer characters, a fraction of the set of email addresses that begin with the most common letter, a number of distinct first letters in the domain name portion of the set of email addresses, whether all email addresses in the set of email addresses begin with an uppercase letter, whether all email addresses in the set of email addresses begin with a lowercase letter, or a degree of closeness of the number of email addresses, in the set of email addresses, to a multiple of a first round number.

14. The system of claim 13, wherein one or more feature values of the plurality of feature values pertain to the client device that provided the input or to the user that initiated the input.

15. The system of claim 13, wherein the instructions, when executed by the one or more processors, further cause:

normalizing one or more feature values of the plurality of feature values to generate one or more normalized feature values;

generating the score comprises inputting the one or more normalized feature values into the model to generate the score.

16. The system of claim 13, wherein the instructions, when executed by the one or more processors, further cause:

training the model based on a first plurality of data sets, each of which is labeled as a first type of data set.

17. The system of claim 16, wherein the instructions, when executed by the one or more processors, further cause:

storing a second plurality of data sets, each of which is labeled as the first type of data set;

storing source data that indicates a source for each data set in the second plurality of data sets;

wherein a first source is a source for a first set of data sets in the second plurality of data sets;

wherein a second source is a source for a second set of data sets in the second plurality of data sets;

randomly selecting one or more first data sets from the first set of data sets, wherein the first plurality of data sets includes the one or more first data sets;

randomly selecting one or more second data sets from the second set of data sets, wherein the first plurality of data sets includes the one or more second data sets.

18. The system of claim 16, wherein the instructions, when executed by the one or more processors, further cause:

training the model based on a second plurality of data sets, each of which is labeled as a second type of data set that is different than the first type.

19. The system of claim 18, wherein the instructions, when executed by the one or more processors, further cause:

storing a third plurality of data sets, each of which is labeled as the second type of data set;

randomly selecting data sets from the third plurality of data sets to identify the second plurality of data sets.

20. The system of claim 13, wherein the instructions, when executed by the one or more processors, further cause:

determining a number of email addresses in the set of one or more email addresses;

if the number of email addresses is within a first range, then identifying a first plurality of feature values, wherein the score is generated based on the first plurality of feature values if the number of email addresses is within the first range;

if the number of email addresses is within a second range that is different than the first range, then identifying a second plurality of feature values that are different than the first plurality of feature values, wherein the score is generated based on the second plurality of feature values if the number of email addresses is within the second range.

21. The system of claim 13, wherein the instructions, when executed by the one or more processors, further cause:

determining the number of email addresses in the set of one or more email addresses;

if the number is less than a particular threshold, then, for each feature value of one or more feature values in the plurality of feature values, identifying a weight;

wherein generating the score comprises generating the score based on the weight identified for said each feature value of the one or more feature values.

22. A method comprising:

receiving, from a client device, input that includes a set of multiple email addresses;

in response to receiving the input:
- identifying a plurality of feature values associated with the input;
- based on the plurality of feature values, generating a score;

based on the score, determining whether to send, to the client device, information about multiple users, each user being different than a user of the client device and being associated with an email address in the set of multiple email addresses;

determining, based on the score, to not send, to the client device, information about any user that is associated with any email address in the set of multiple email addresses;

receiving, from a second client device, second input that includes a second set of one or more email addresses;

in response to receiving the second input:
- identifying a second plurality of feature values associated with the second input;
- based on the second plurality of feature values, generating a second score;

based on the second score, determining to send, to the second client device, second information about one or more users, each user being different than a user of the second client device and being associated with an email address in the second set of one or more email addresses;

determining whether an existing member of a social network service is registered with an email address indicated in the second set of one or more email addresses;

based on the second score and determining that an existing member of the social network service is registered with a particular email address indicated in the second set of one or more email addresses, sending the second information to the second client device.

* * * * *